(12) United States Patent
Ko et al.

(10) Patent No.: US 6,185,369 B1
(45) Date of Patent: Feb. 6, 2001

(54) APPARATUS AND METHOD FOR SYNCHRONOUSLY REPRODUCING MULTI-ANGLE DATA

(75) Inventors: Jung-Wan Ko, Suwon; Tae-Yun Chung, Kwachun, both of (KR)

(73) Assignee: Samsung Electronics Co., LTD, Suwon (KR)

( * ) Notice: Under 35 U.S.C. 154(b), the term of this patent shall be extended for 0 days.

(21) Appl. No.: 08/931,485

(22) Filed: Sep. 16, 1997

(30) Foreign Application Priority Data

Sep. 16, 1996 (KR) .................................................. 96-40239
Sep. 12, 1997 (KR) .................................................. 97-46895

(51) Int. Cl.$^7$ ........................... H04N 5/781; H04N 5/765
(52) U.S. Cl. .............................. 386/125; 386/46; 386/52
(58) Field of Search ..................................... 386/125, 126, 386/46, 52, 109, 111, 112, 92, 96, 1, 4, 105, 106, 40; 360/32; H04N 5/781, 5/765

(56) References Cited

U.S. PATENT DOCUMENTS 5,819,003  * 10/1998  Hirayama et al. ..................... 386/95
5,848,216  * 12/1998  Kaneshige ............................. 386/46

FOREIGN PATENT DOCUMENTS 7-129624   5/1995   (JP) .
8-251538   9/1996   (JP) .

* cited by examiner

*Primary Examiner*—Robert Chevalier
(74) *Attorney, Agent, or Firm*—Staas & Halsey LLP

(57) ABSTRACT

An apparatus for synchronously reproducing compressed and multiplexed data for multi-angle reproduction. The apparatus for synchronously reproducing multi-angle data includes a plurality of reproducers to receive a data stream in which multi-angle data is multiplexed for multi-angle reproduction, to separate, decode and reproduce data corresponding to a predetermined angle from the received data stream and to generate a reproduction ready notice signal indicating that data is ready for reproduction. One of the plurality of reproducers synchronizes data reproduction of the plurality of reproducers based on the reproduction ready notice signals generated by the other reproducers. Thus, images involving various angles at an instant can be provided to a user.

40 Claims, 2 Drawing Sheets

APPARATUS AND METHOD FOR SYNCHRONOUSLY REPRODUCING MULTI-ANGLE DATA

BACKGROUND OF THE INVENTION

1. Field of the Invention

The present invention relates to an apparatus and method for synchronously reproducing multi-angle data, and more particularly, to an apparatus and method for synchronously reproducing individual image data corresponding to various viewing angles and/or audio data.

A study of reproducing an image at a viewer's viewing angle among images photographed at various angles is now in progress. Such a technique is called a multi-angle reproduction, such that a viewer can select and view one among a variety of images photographed at various angles, for example, an electric sign board, a close-up of a player, or an entire view of a sports ground or stadium, in case of a sports relay broadcast. In a digital versatile disk (DVD) system using a compression method of the MPEG-2 standard, images photographed at nine angles at a maximum are compressed and then multiplexed in the form of a program stream

2. Description of the Related Art

FIG. 1 shows a data stream for multi-angle-reproducing data multiplexed in the form of a program stream. Individual data D1, D2, . . . , and D9 constituting a data stream contains video data of a sight or scene at an individual viewing angle. A reproduction apparatus according to the DVD standard extracts data of a particular viewing angle from a data stream and reproduces the extracted data, using viewing angle information among data search information for compressed data.

However, such a conventional apparatus provides only an image of a single viewing angle at any given time.

SUMMARY OF THE INVENTION

To solve the above problem, it is an object of the present invention to provide an apparatus for synchronously reproducing data compressed and multiplexed for a multi-angle reproduction.

To accomplish the above and other objects of the present invention, there is provided an apparatus for synchronously reproducing multi-angle data including a plurality of reproducers to receive a data stream in which multi-angle data is multiplexed for multi-angle reproduction, to separate, decode and reproduce data relating to a corresponding predetermined angle from the received data stream and to generate a reproduction ready notice signal indicating that the separated data is ready for reproduction, wherein one of the plurality of reproducers synchronizes data reproduction of the plurality of reproducers based on the reproduction ready notice signals generated by the other reproducers.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

A preferred embodiment of the present invention will be described with reference to the accompanying drawings.

Figure 2:
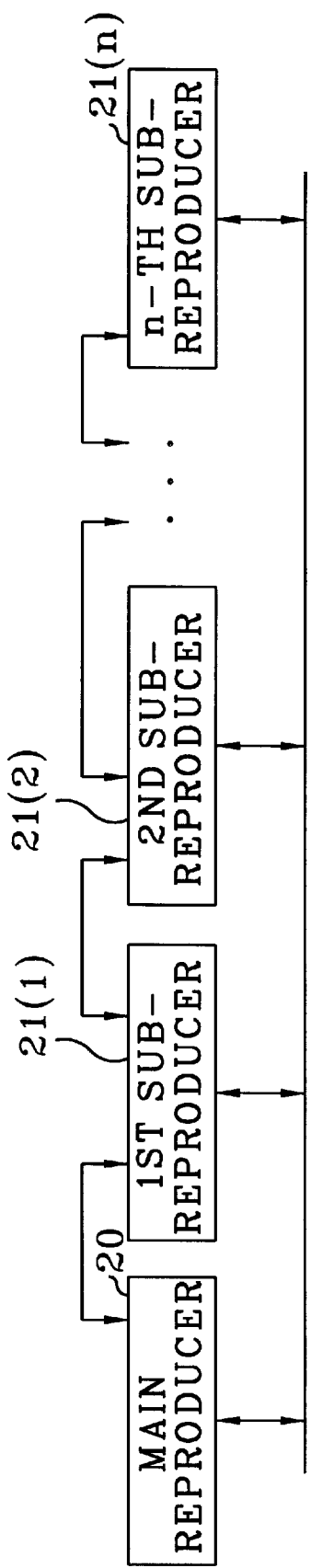
FIG. 2 shows an apparatus for synchronously reproducing multi-angle data according to an embodiment of the present invention.

FIG. 2 shows an apparatus for synchronously reproducing multi-angle data according to an embodiment of the present invention, the apparatus including a plurality of reproducers 20, 21(1), . . . , and 21(n) which are sequentially connected one after another. The number of reproducers is identical to the number of angles of multiplexed data for multi-angle reproduction, in which nine reproducers are connected at a maximum in the case of a DVD system. A main reproducer 20 among the plurality of reproducers 20, 21(1), . . . , and 21(n) receives a data stream in which data is multiplexed for multi-angle reproduction obtained from a DVD disk. Later on, when broadcasting providing multi-angle reproduction is initiated, a data stream in which data is multiplexed for multi-angle reproduction is obtained from a cable TV or a wireless broadcasting station. The sub-reproducers 21(1), . . . , and 21(n) receive the data stream from the preceding reproducer, respectively. The main reproducer 20 and the sub-reproducers 21(1), . . . , and 21(n) separate data corresponding to a predetermined angle from the received data stream, respectively. The main reproducer 20 and the sub-reproducers 21(1), . . . , and 21(n) decode and reproduce the separated data at respective angles. The main reproducer 20 controls synchronization of data reproduction of the main reproducer 20 and the sub-reproducers 21(1), . . . , and 21(n). The detailed structure of the main reproducer 20 is shown in FIG. 3.

Figure 3:
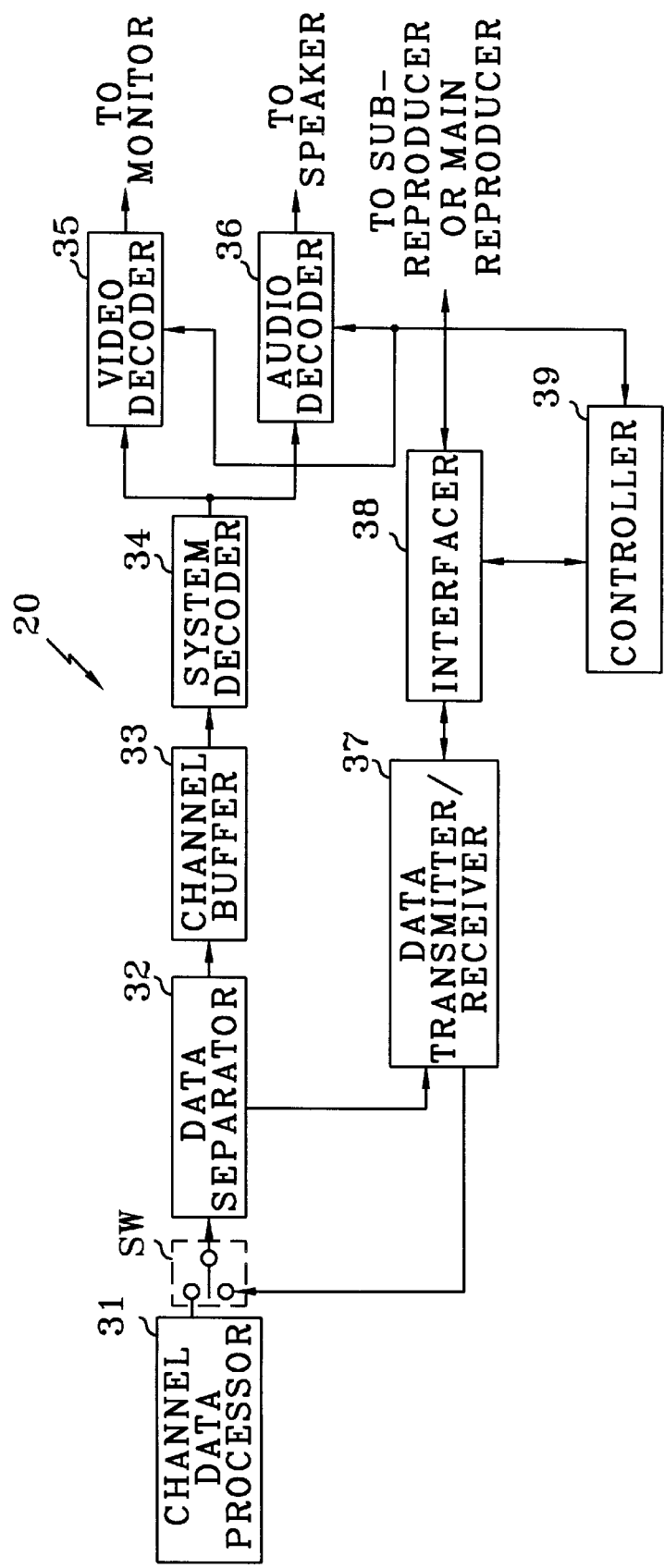
FIG. 3 is a block diagram showing a main reproducer shown in FIG. 2.

FIG. 3 is a block diagram showing the main reproducer 20 of FIG. 2. The main reproducer 20 shown in FIG. 3 includes a channel data processor 31 for receiving a data stream in which data read from a storage medium such as a DVD and received from a broadcasting station for multi-angle reproduction is multiplexed, and processing the received data in the form of a desired pattern, a switch SW for selecting between the data stream processed in the channel data processor 31 and a data stream received from a preceding reproducer for the other viewing angles and a data separator 32 for separating data corresponding to a predetermined angle from the data stream selected by the switch SW. A channel buffer 33 temporarily stores the data separated in the data separator 32 and outputs the stored data at a certain bit rate. The main reproducer 20 also includes a system decoder 34 for separating video and audio data contained in the data output from the channel buffer 33, and a video decoder 35 and an audio decoder 36 for receiving the separated video and audio data and decoding the received data, respectively. An interfacer 38 performs interfacing with the sub-reproducers 21(1), . . . , and 21(n). Meanwhile, the main reproducer 20 includes a controller 39 for controlling reproduction of the multi-angle data in synchronization with the sub-reproducers 21(1), . . . , and 21(n), and a data transmitter/receiver 37 for transmitting and receiving data of the other viewing angles. The sub-reproducers 21(1), . . . , and 21(n) may have the same structure as that of the main reproducer 20 shown in FIG. 3, or a different structure therefrom, respectively. When the sub-reproducers 21(1), . . . , and 21(n) are constructed differently from the main reproducer 20, they do not have a device for directly reproducing data from a disk or receiving an aerial broadcast (not shown in FIG. 3) nor the channel data processor 31, which are included in the main reproducer 20 shown in FIG.

3. When the same structure as that of the main reproducer 20 is used as the sub-reproducer, one of the reproducers which accepts a disk and initially reproduces data from the disk is automatically set as a main reproducer and the other reproducers not containing a disk are automatically set as sub-reproducers. Here, the operations of the main reproducer 20 and the sub-reproducers 21(1), . . . , and 21(n) will be described below in more detail with reference to FIG. 3.

Figure 1:
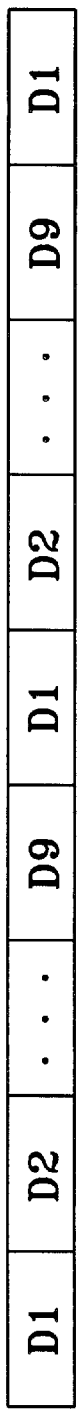
FIG. 1 shows a data stream for multi-angle-reproducing data multiplexed in the form of a program stream according to a conventional apparatus for reproducing multi-angle data.

In the main reproducer 20, the channel data processor 31 receives a data stream for multi-angle reproduction which is multiplexed in the form of a program stream of FIG. 1 received from an aerial broadcast, a cable TV or read from a storage medium such as a DVD, and processes the received data in a necessary form. The data stream processed in the channel data processor 31 is input to the data separator 32 via the switch SW. The data separator 32 separates data corresponding to a predetermined angle from the received data stream and outputs the separated data to the channel buffer 33, and the data stream containing the remaining data to the data transmitter/receiver 37. In case of the DVD system, the data separator 32 separates only data of the predetermined angle using data search information contained in the data stream. For example, when only data corresponding to a certain angle is intended to be reproduced, the data separator 32 separates data D1 among the data multiplexed in the form of the program stream of FIG. 1 and outputs the separated result to the channel buffer 33, and outputs the data D2 through D9 of the other angles to the data transmitter/receiver 37. The data transmitter/receiver 37 transmits the data stream containing the data of the other angles output from the data separator 32 to a first sub-reproducer 21(1) via the interfacer 38. Since the data corresponding to the predetermined angle separated in the data separator 32 is compressed and encoded according to the MPEG-2 standard and has an inconsistent bit rate, the channel buffer 33 temporarily stores the data and outputs it to the system decoder 34 at a constant bit rate. The system decoder 34 separates video and audio data of the corresponding angles contained in the data output from the channel buffer 33 and outputs them to the video decoder 35 and the audio decoder 36, respectively. The video decoder 35 decodes the input video data according to the MPEG-2 standard. The audio decoder 36 decodes the input audio data according to the AC 3 or MPEG-2 standard.

Meanwhile, each of the sub-reproducers 21(1), . . . , and 21(n) has the same structure as that of the main reproducer 20 and operates in the same manner as that of the main reproducer 20. In each of the sub-reproducers 21(1), . . . , and 21(n), the data separator 32 receives, via the switch SW, the data stream of the remaining angles received by the data transmitter/receiver 37 from a preceding reproducer via the interfacer 38. The data separator 32 separates data corresponding to the predetermined angle from the input data stream and outputs the separated result to the channel buffer 33, and outputs the data of the other angles to the data transmitter/receiver 37. The first sub-reproducer 21(1) receives data of the angles other than that corresponding to the main reproducer 20, a second sub-reproducer 21(2) receives data of the angles other than that corresponding to the main reproducer 20 and first sub-reproducer 21(1), and the other sub-reproducers receive data in the same manner, to thereby separate data of a desired angle therefrom. Likewise, the data photographed at various angles is separated during passing through the respective reproducers.

A respective video decoder 35 in the sub-reproducers 21(1), . . . , and 21(n) temporarily stops at the time when data corresponding to an initial image has been decoded, and informs the controller 39 that a reproduction operation is ready by generating a reproduction ready notice signal. The controller 39 informs the main reproducer 20 via the interfacer 38 that the reproduction is ready, in response to the reproduction ready notice signal output from the video decoder 35. A controller 39 of the main reproducer 20 generates a reproduction command to all of the sub-reproducers 21(1), . . . , and 21(n) via the interfacer 38 if reproduction ready notice signals are supplied from all of the subreproducers 21(1), . . . , and 21(n). If a reproduction command generated in the main reproducer 20 is applied via the interfacer 28, each controller 39 of the sub-reproducers 21(1), . . . , and 21(n) outputs an image decoded by the video decoder 35 to a monitor (not shown) in a synchronization with the reproduction command. In this case, the main reproducer 20 outputs an image decoded in the video decoder 35 to an unshown monitor in synchronization with the reproduction command. Each controller 39 of the reproducers 20, 21(1), . . . , and 21(n) outputs an audio signal decoded in the audio decoder 36 to a speaker (not shown) in synchronization with the output of the video decoder 35. Here, there are a synchronous multi-angle reproduction having the same audio signal with respect to the multi-angle images, and an asynchronous multi-angle reproduction having a different audio signal with respect to the multi-angle images. In the case of the synchronous multi-angle reproduction, the controller 39 of the main reproducer 20 controls only one reproducer of the main reproducer 20 and the sub-reproducers 21(1), . . . , and 21(n) to reproduce audio data. In the case of the asynchronous multi-angle reproduction, the controller 39 of the main reproducer 20 controls a respective audio decoder 38 of the main reproducer 20 and the sub-reproducers 21(1), . . . , and 21(n) to reproduce audio data. As a result, only one audio signal among the reproduced audio signals is selected using an external selection device (not shown).

The main reproducer 20 reads a data stream where data for multi-angle reproduction is multiplexed from a disk, in which the disk is reproduced at sufficiently fast speed so that the data stream is supplied to all the sub-reproducers 21(1), . . . , and 21(n) within a predetermined time. All the sub-reproducers 21(1), . . . , and 21(n) can use the same disk as in the main reproducer 20, and read the multiplexed data stream from the disk. In this case, a disk is reproduced at normal speed and reproduction information is given to or taken from the main reproducer 20 for synchronous reproduction.

Meanwhile, a DVD system or a digital broadcasting system can be constructed so that a plurality of audio information can be supported. In the case of a DVD system which can support a multi-lingual service, a multiplexed data stream contains audio data for multi-language as eight sub-streams at maximum. Accordingly, when the respective sub-streams are reproduced, eight different language voices can be listened to. When the above sub-streams are applied to the present invention, the sub-reproducers 21(1), . . . , and 21(n) can reproduce a respectively different language voice. That is, a respectively different language voice can be output with respect to the same image.

An IEEE 1394 transmission standard proposed as a recent International Standard can be used in a method of connecting reproducers of FIG. 2. In case of the IEEE 1394 transmission standard, a bidirectional transmission condition is met and simultaneously an isochronous mode and an asynchronous mode are supported. Also, since a maximum transmission speed is 400 Mbps, the IEEE 1394 standard is appropriate for the application field in which sync information is sent between the reproducers on occasion, and simultaneously video and audio information is given to or taken from each other at a certain period of time.

As described above, an apparatus for synchronously reproducing data for multi-angle reproduction according to the present invention separates the data compressed and multiplexed for multi-angle reproduction at respective viewing angles and reproduces the separated data synchronously. Therefore, images corresponding to various viewing angles at an instant can be provided to a user, which can fulfill various viewers' desires.

While only certain embodiments of the invention have been specifically described herein, it will be apparent that numerous modifications may be made thereto without departing from the spirit and scope of the invention.

What is claimed:

1. An apparatus for synchronously reproducing multiplexed multi-angle data in a data stream comprising:
    a plurality of reproducers to receive the data stream, each reproducer separating, decoding, and reproducing the multi-angle data relating to a corresponding predetermined angle from the received data stream, and generating a reproduction ready notice signal indicating that the multi-angle data of the corresponding predetermined angle is ready for reproduction,
    wherein one of the plurality of reproducers synchronizes data reproduction of the plurality of reproducers based on the reproduction ready notice signals generated by the other reproducers.

2. The apparatus according to claim 1, wherein the multi-angle data contained in the data stream includes video and audio data of the corresponding predetermined angles.

3. The apparatus according to claim 2, wherein the video data is compressed and encoded data.

4. The apparatus according to claim 3, wherein the video data is compressed and encoded according to an MPEG standard.

5. The apparatus according to claim 2, wherein the video data and the audio data is compressed and encoded.

6. The apparatus according to claim 5, wherein the video data and the audio data is compressed and encoded according to an MPEG standard.

7. The apparatus according to claim 2, wherein said one reproducer for controlling synchronization of reproduction controls only a reproducer among the plurality of reproducers to reproduce audio data.

8. The apparatus according to claim 2, wherein said one reproducer for controlling synchronization of reproduction controls each of the other reproducers to reproduce only audio data.

9. The apparatus according to claim 8, wherein the multi-angle data includes audio data for multi-language, and said one reproducer for controlling synchronization reproduction controls each of the other reproducers to reproduce corresponding different language audio data.

10. The apparatus according to claim 1, wherein the plurality of reproducers are connected one after another so that said one reproducer for controlling synchronization reproduction receives the multiplexed multi-angle data of the data stream, each of the other reproducers receives a data stream from a preceding reproducer, extracts the multi-angle data corresponding to the predetermined angle from the received data stream, and supplies the data stream containing remaining data to a following reproducer.

11. The apparatus according to claim 10, wherein said one reproducer for controlling synchronization of reproduction reads the multiplexed multi-angle of the data stream from a disk faster than a data processing speed of each of the other reproducers.

12. The apparatus according to claim 10, wherein each of the plurality of the reproducers has a data processing rate higher than a transmission rate of the received data stream, respectively.

13. The apparatus according to claim 10, wherein said one reproducer for controlling synchronization for reproduction comprises:
    a channel data processor to process the received data stream in a desired data form;
    a switch to select one among the data stream processed in said channel data processor and a data stream supplied from a preceding reproducer;
    a data separator to separate the multi-angle data relating to a corresponding predetermined angle from the data stream selected by said switch;
    a data transmitter/receiver unit to supply the data stream containing remaining data after the multi-angle data of the corresponding predetermined angle is separated by said data separator, to a following reproducer;
    a system decoder to separate video and audio data contained in the multi-angle data separated in said data separator;
    a video decoder to decode the video data separated in said system decoder, to generate a reproduction ready notice signal for said one reproducer which controls synchronization of reproduction in response to the video data corresponding to an initial image being decoded, and to output the decoded video data under the control of said one reproducer; and
    an audio decoder to decode the audio data separated in said system decoder, and to output the decoded audio data according to the output of said video decoder.

14. The apparatus according to claim 13, wherein said data transmitter/receiver unit comprises an interfacer for satisfying an IEEE 1394 transmission standard to interface with the other reproducers.

15. The apparatus according to claim 1, wherein a number of said plurality of the reproducers is the same as that of a number of angles of the multiplexed data for multi-angle reproduction.

16. An apparatus for reproducing multiplexed multi-angle data in a data stream, comprising:
    a plurality of reproducers to receive the data stream, each reproducer separating, decoding and reproducing the multi-angle data relating to a corresponding predetermined angle;
    wherein one of said plurality of reproducers synchronously controls the reproduction of said plurality of reproducers.

17. An apparatus as claimed in claim 16, wherein:
    each of the other reproducers generates a reproduction ready notice signal when a reproduction operation is ready to be performed; and
    said one reproducer synchronizes data reproduction of said plurality of reproducers based upon the reproduction ready notice signals generated by the other reproducers.

18. An apparatus as claimed in claim 17, wherein said one reproducer generates a reproduction command to all of the other reproducers in response to receiving the reproduction ready signals from all of the other reproducers, the reproduction command controlling reproduction by the other reproducers.

19. An apparatus as claimed in claim 16, wherein said plurality of reproducers are sequentially connected to one another.

20. An apparatus as claimed in claim 16, wherein said plurality of reproducers are sequentially connected to one another and said one reproducer receives the multiplexed multi-angle data, and each of the other reproducers receiving the data stream from a preceding reproducer, extracts the multi-angle data relating to the corresponding predetermined angle from the received data stream, and supplying the receiving data stream containing remaining data to a following reproducer.

21. An apparatus as claimed in claim 17, wherein said plurality of reproducers are sequentially connected to one another.

22. An apparatus as claimed in claim 16, wherein a number of reproducers is equal to a number of angles of the multi-angle data.

23. An apparatus as claimed in claim 16, wherein said one reproducer comprises:
   a data separator to separate the multi-angle data relating to the corresponding predetermined angle; and
   a channel buffer to temporarily store the separated multi-angle data and to output the stored multi-angle data at a constant bit rate.

24. An apparatus as claimed in claim 16, wherein said one reproducer comprises:
   a data separator to separate the multi-angle data relating to the corresponding predetermined angle;
   a channel buffer to temporarily store the separated multi-angle data and to output the stored multi-angle data at a constant bit rate;
   a system decoder to separate video data and audio data from separated multi-angle data output by said channel buffer;
   a video decoder to decode the video data;
   an audio decoder to decode the audio data; and
   an interfacer to interface with the other reproducers.

25. An apparatus as claimed in claim 24, wherein said one reproducer further comprises:
   a channel data processor to receive the multi-angle data stream; and
   a switch to alternately enable transmission of the data stream from said channel data processor and a data stream from a preceding one of said plurality of processors;
   a data transmitter/receiver to supply the data stream containing remaining data after said data separator separates the multi-angle data relating to the corresponding predetermined angle and to receive the data stream from the preceding one of said plurality of processors;
   wherein said data separator separates the multi-angle data of the data stream transmitted by said switch.

26. An apparatus as claimed in claim 25, wherein each of the other reproducers has a same configuration as said one reproducer.

27. An apparatus as claimed in claim 16, wherein any one of said plurality of reproducers receives an optical disk containing the multi-angle data, and in response, is designated as said one reproducer.

28. An apparatus as claimed in claim 24, wherein any one of said plurality of reproducers receives an optical disk containing the multi-angle data, and in response, is designated as said one reproducer.

29. An apparatus as claimed in claim 17, wherein each of the other reproducers generates the reproduction ready notice signal in response to completion of decoding of a corresponding initial image.

30. An apparatus as claimed in claim 24, wherein each of the other reproducers has a same configuration as said one reproducer, and each video decoder of the other reproducers temporarily stops at a time when data corresponding to an initial image has been decoded, and in response, generates the corresponding reproduction ready notice signal.

31. An apparatus as claimed in claim 30, wherein said one reproducer generates a reproduction command to all of the other reproducers to control reproduction of all the other reproducers, in response to receipt of the reproduction ready notice signals from all of the other reproducers.

32. An apparatus as claimed in claim 22, wherein said one reproducer receives the multi-angle data from an optical disk.

33. An apparatus as claimed in claim 20, wherein said one reproducer receives the multi-angle data from a cable TV.

34. An apparatus as claimed in claim 20, wherein said one reproducer receives the multi-angle data from a wireless transmitter.

35. An apparatus as claimed in claim 20, wherein the multi-angle data includes video data of a given angle and audio data of a plurality of different languages, and the other reproducers respectively reproduce the audio data of respective ones of the plurality of different languages.

36. An apparatus as claimed in claim 26, wherein the multi-angle data includes video data of a given angle and audio data of a plurality of different languages, and the audio decoders of the other reproducers respectively reproduce the audio data of respective ones of the plurality of different languages.

37. An apparatus for reproducing multiplexed multi-angle data in a data stream, comprising:
   a plurality of reproducers, sequentially connected to one another, to receive the data stream, each reproducer extracting and reproducing the multi-angle data relating to a corresponding predetermined angle, and forwarding remaining data of the data stream to a following one of the reproducers;
   wherein one of said plurality of reproducers initially receives the data stream, and synchronously controls reproduction of said plurality of reproducers.

38. A method of reproducing multiplexed multi-angle data in a data stream, comprising the steps of:
   receiving by reproducers the multiplexed multi-angle data; and
   synchronously controlling the reproducers reproducing each of the multi-angle data relating to corresponding predetermined angles.

39. A method as claimed in claim 38, wherein said step of synchronously controlling the reproducers further comprises the steps of:
   sequentially extracting and decoding the multi-angle data relating to the corresponding predetermined angles from the data stream;
   generating a reproduction ready signal each time the multi-angle data of one of the corresponding predetermined angles is completed; and
   controlling reproduction of all of the decoded multi-angle data of the corresponding predetermined angles in response to all of the reproduction ready signals being generated.

40. A method of reproducing multiplexed multi-angle data in a data stream, comprising:
   receiving the multiplexed multi-angle data; and
   controlling synchronous reproduction of each of the multi-angle data of corresponding predetermined angles, reproducing simultaneously each of the multi-angle data of the predetermined angles.

* * * * *